May 5, 1964          K. REHM          3,131,929
CONVEYOR
Filed July 26, 1961          2 Sheets-Sheet 2
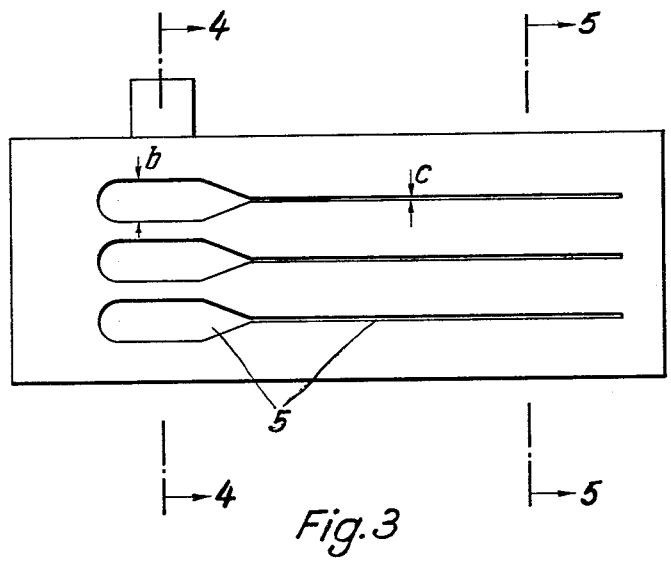
*Fig. 3*
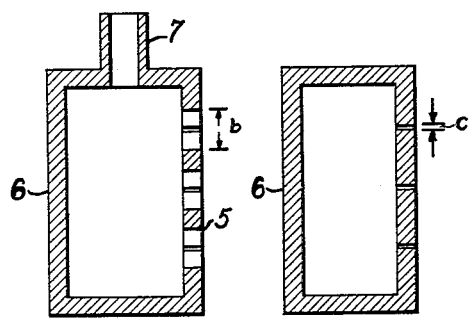
*Fig. 4*     *Fig. 5*
INVENTOR
Karl Rehm
BY George B. Spencer
ATTORNEY

United States Patent Office 3,131,929
Patented May 5, 1964

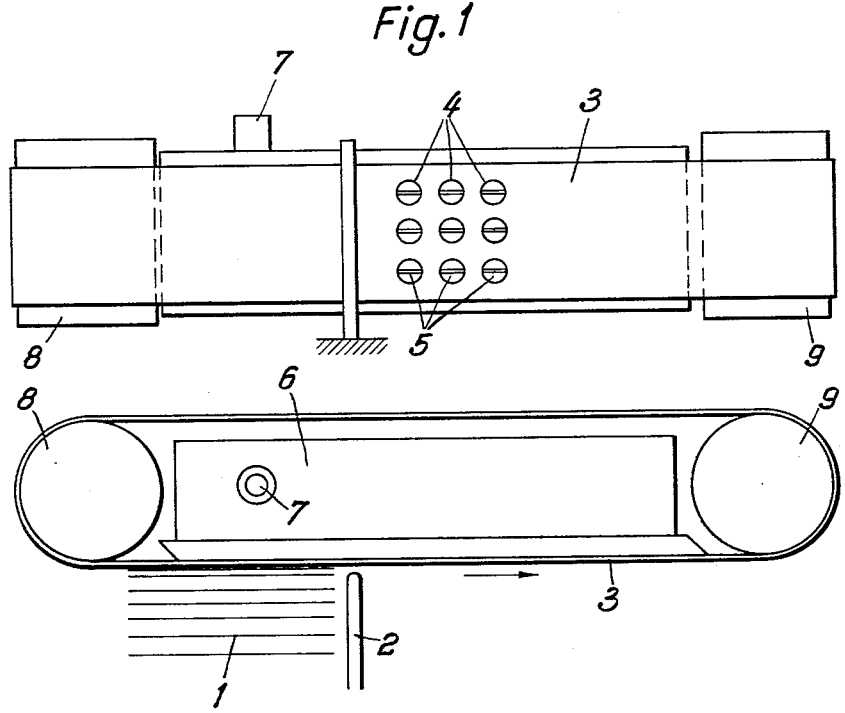
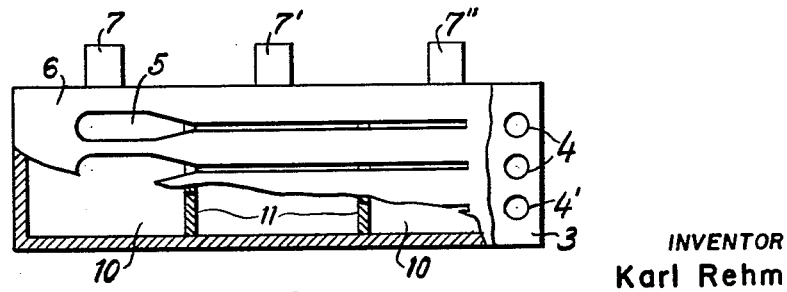

3,131,929
CONVEYOR
Karl Rehm, Konstanz (Bodensee), Germany, assignor to Telefunken Patentverwertungs-G.m.b.H., Ulm, Donau, Germany
Filed July 26, 1961, Ser. No. 127,060
Claims priority, application Germany July 30, 1960
8 Claims. (Cl. 271—26)

The present invention relates generally to conveyors, and more particularly to conveyors of the suction type which are used in sorting plants and the like.

Suction belt type separating devices for sorting plants have been known and used in the past. In such known devices a belt having suction openings extends over suction slots of a suction trough. The vacuum pressure in this trough draws shipments onto the belt from a stack. These shipments are flat shipments such as mail. Usually groups of suction openings are formed in the belts with the distances between groups corresponding to the desired distance between shipments during conveying. Such suction belt separating devices are especially useful for flat material which is to be sorted, such as letters, post cards, money orders, forms, or the like.

Individual shipments in such stacks are different in size and weight. At the receiving or transferring zone where the shipments in the stack are picked up by the belt, the shipments should be drawn onto the suction belt with a large suction force so that the transfer is always as fast as possible. Therefore, these suction openings are made as large as possible, and the suction slots in the suction trough are made correspondingly as wide. The suction slots are provided for a major portion of the conveying path through which the shipments will be transported by the suction belt. The suction slots are sealed between the groups of suction openings by the solid portion of the belt extending therebetween so that no air will be drawn into the vacuum chamber of the suction trough. The openings of the belt are normally covered by shipments which adhere thereto due to the vacuum pressure. However, sometimes no shipment is picked up from the stack by the suction openings. In such an event the suction openings extend over the suction slots of the trough and the vacuum pressure in the trough immediately collapses due to the large volume of air which is drawn through the slots. It is then impossible for the suction belt to pick up and retain shipments with subsequent groups of suction openings, since the vacuum pressure has collapsed and there is no opportunity for it to build up again. It is practically impossible to provide a vacuum producing unit which is sufficiently large to provide a vacuum pressure sufficient to withdraw and retain shipments against the belt when the suction openings are open to the atmosphere.

With these defects of the prior art in mind it is a main object of this invention to provide a suction device for a separating device which will always maintain a vacuum pressure even when a group of suction openings in the belt fails to pick up a shipment, so that vacuum pressure is constantly provided.

Another object of this invention is to provide a suction trough over which the suction belt runs, and which has suction slots adapted to prevent the collapse of vacuum pressure in the event that no shipment covers the suction openings of a belt.

These objects and others ancillary thereto are accomplished according to a preferred embodiment of the invention wherein the suction slots are so shaped that they are wider at the transfer zone where the shipments are to be removed from a stack, and are narrower along a subsequent length of the conveying belt. This narrow portion of the slots throttles or limits the air flow through the slots along the length of the conveying belt in the event no shipment covers the suction openings. The suction trough is preferably combined with a suction belt type of separating device. However, this invention is applicable wherever material is to be conveyed using suction means.

Additional objects and advantages of the present invention will become apparent upon consideration of the following description when taken in conjunction with the accompanying drawings in which:

FIGURE 1 is an elevational view of the suction trough of the present invention used in connection with a suction belt separating device.

FIGURE 2 is a plan view of the device shown in FIGURE 1.

FIGURE 3 is a side elevational view illustrating the top of a suction trough and wherein the shape of the suction slots is clearly shown.

FIGURE 4 is a vertical sectional view taken substantially along the plane defined by line 4—4 of FIGURE 3.

FIGURE 5 is a vertical sectional view taken substantially along the plane defined by line 5—5 of FIGURE 3.

FIGURE 6 is a side elevational view, partly in section, illustrating modifications of the invention.

With more particular reference to the drawings, FIGURES 1 and 2 illustrate the shipments 1 disposed in a stack, with their leading edges abutting against a stationary wall 2. One end of the stack engages suction belt 3 which has groups of suction openings 4. The distance between groups corresponds to the desired conveying distance between shipments. Suction openings 4 travel over suction slots 5 of suction trough 6. This suction trough 6 is connected with a vacuum producing means at 7. Rollers 8 and 9 are provided over which the suction belt 3 extends.

FIGURE 3 clearly illustrates the shape of the suction slots 5 of trough 6. At the reception or transfer zone adjacent the stack of shipments, the suction slots are wide, the width of which corresponds to the width or diameter of suction openings 4. This is cleary indicated in FIGURE 4. When a group of suction openings 4 at the transfer zone moves over this wider portion of the suction slots, a letter or shipment of the stack adjacent to the belt is drawn onto the belt by the great suction force applied due to the large area provided by the suction openings and this wide portion of the suction slots. A letter which is thus transferred from the stack to the belt by suction force is also carried along the belt by this suction force. The length of the conveying path of the suction belts varies in particular arrangements. Previously, the suction slots were of constant width from the transfer zone to the end of the conveying path. In such an arrangement, when, as occurs from time to time, no shipment was picked up by a group of suction openings, enormous amounts of air would flow into the suction trough through the uncovered openings. There was no limit to the amount of air which could flow due to the large suction openings and the wide suction slots. The result was a collapse of the vacuum pressure which rendered it impossible to draw shipments onto the belt at the transfer zone with any degree of certainty.

However, as may be seen in FIGURE 3, the present invention provides suction slots which, at the transfer or reception zone, are relatively wide and have a width $b$ corresponding to the width or diameter of the suction openings 4. The width $c$ of the suction slots which is downstream of the conveying path of the suction belt is substantially smaller than the width of the suction openings. Thus, at the reception or transfer zone a relatively large suction force is available for drawing shipments against the belt. For transporting the shipments the same suction force is available since the cross section of the suction openings remains the same. However, along the conveying path of the suction belt only small amounts of air need be drawn off by the small suction slots of width $c$. This air which should be drawn away is the undesired air which flows into the suction trough due to leakages. However, the amount of leakage air is always small. Thus, the narrow suction slots are sufficient for this purpose and the widths may be from one to several tenths of a millimeter. If a larger width $c$ is chosen, there will be greater ease in the manufacturing of these slots in the troughs but, in this event the throttling effect will be lessened. The width $c$ is determined in proportion to the width $b$ taking into consideration the capacity of the vacuum producing unit.

If the suction openings of the conveyor belt are open, as when no shipment is picked up at the transfer zone, only a relatively small volume of air will flow through the narrow suction slots over the path of the suction belt. A small width of these slots causes a strong throttling of the air flowing into the suction trough so that the vacuum pressure is not substantially changed. The wide portion of the suction slots at the transfer zone is very short in longitudinal direction, so that the suction openings will travel over the wide portion very quickly. Thus, no large volumes of air can flow in this region where the suction slots are wide, even when no shipment is picked up by the suction openings of the belt. Along the path of the conveyor belt, which in some circumstances is quite long, the slots are narrow and a great throttling effect is provided so that there is no disturbing decrease of the vacuum pressure.

This design of the suction slots according to the present invention permits stopping of the suction belt at any point whatsoever without the vacuum pressure collapsing or diminishing to such a small value that the smooth functioning of the apparatus will cease. If a group of suction openings should stop over the wide section of the suction slots at the transfer zone, a shipment will be drawn against the belt which covers the suction openings and seal them or substantially seal them. If the group of suction openings stops in a zone where the suction slots are narrow, without a shipment being held to the belt and covering the openings, only a relatively small volume of air will flow due to the throttling effect. A sufficient vacuum pressure is preserved and maintained to allow the shipments to be drawn against the belt immediately after starting the operation.

If a group of suction openings stops at a transfer zone when there is no shipment in the stack, the vacuum pressure will collapse. When belt movement is initiated the suction openings will move past the large section of the slots and over the zone where the slots are small. During this time a sufficient vacuum pressure will be built up so that the next group of suction openings will, with certainty, take up a shipment at the transfer zone.

As shown in FIGURE 6, the suction trough may be subdivided into several sections 10 longitudinally disposed with respect to the conveying path. This may be accomplished by partitions 11 extending transversely to the direction of conveying. In this event each of these sections is separtely connected with the vacuum producing unit by means of separate conduits 7, 7′, 7″ of suitable cross section.

The group of suction openings of the suction belt may be of different size, since often it is advantageous, when handling upright shipments to provide a greater drawing or suctional force on a lower portion of such shipments. Thus, in this type of arrangement the bottom row of openings 4′ may be larger than the top openings 4.

A suction trough having suction slots designed according to the teachings of this invention provides a large suction force at the transfer zone similar to the forces available in known types of suction belt separating devices. However, the present invention obviates the disadvantages of the known devices in which the vacuum pressure collapses or decreases to a disturbing level when no shipment is picked up by the suction openings. In such an event, when the present invention is used in a suction belt separating device, substantially the same suction force is available at the transfer zone even when a shipment is not picked up by the suction openings.

It will be understood that the above description of the present invention is susceptible to various modifications, changes, and adaptations, and the same are intended to be comprehended within the meaning and range of equivalents of the appended claims.

What is claimed is:

1. A suction trough for use with a suction belt which runs past a transfer zone, which extends over the trough, and which has suction openings, said trough having at least one elongated slot extending in the direction in which said belt runs, said slot throughout a portion of its length being in registry with said transfer zone, the width of said slot, throughout said portion, corresponding approximately to the width of said suction openings and the width of the remainder of said slot which extends downstream of said zone being substantially less than the width of said suction openings.

2. A suction trough according to claim 1, comprising partition means extending transversely of the direction of conveying, separating said trough into several sections, said partition means including at least one wall disposed in the vicinity of the initial portion of the narrower section of said slot, each section being connectable to a vacuum producing unit.

3. A suction trough according to claim 1, comprising a plurality of said slots.

4. In a suction belt separating unit having a suction belt with groups of openings formed therein, and a suction trough having suction slots a portion of which is disposed in a transfer zone and over which the suction belt moves, the improvement comprising: the suction trough having slots extending through a transfer zone where the suction belt picks up shipments, said slots in said zone corresponding to the width of the suction openings in the belt, and subsequent sections of the suction slots along the remainder of the conveying path being of substantially smaller width than the suction openings.

5. A separating assembly for a sorting plant, comprising, in combination: a suction belt extending through a transfer zone where the belt may pick up shipments from a stack by suction, said belt having suction openings; a suction trough over which said belt runs and having elongated slots extending in the direction in which said belt runs, said slots throughout a portion of their length being in registry with said transfer zone, the width of said slots, throughout said portion, corresponding approximately to the width of said suction openings and the width of the remaining portions of said slots which extend downstream of said zone being substantially less than the width of said suction openings.

6. The assembly of claim 5, wherein the openings along one side of said belt are larger than the other openings.

7. In a suction trough for use with a suction belt which runs past a transfer zone, which extends over the trough, and which has suction openings, the improvement that: said trough has at least one elongated slot extending in the direction in which said belt runs, said slot throughout a portion of its length being in registry with said transfer zone, the width of said slot, throughout said portion, corresponding approximately to the width of said suction openings and the width of the remainder of said slot which extends downstream of said zone being substantially less than the width of said suction openings.

8. In a suction belt separating unit having a suction belt with groups of openings formed therein, and a suction trough having suction slots a portion of which is disposed in a transfer zone and over which the suction belt moves, the improvement comprising: the suction trough having slots extending through a transfer zone where the suction belt picks up shipments, said slots in said zone corresponding to the width of the suction openings in the belt, subsequent sections of the suction slots along the remainder of the conveying path being of substantially smaller width than the suction openings, the portions of said slots in said zone and in the remainder of said path being substantially uniform in width, and relatively short transition portions connecting the substantially uniform portions of each slot.

References Cited in the file of this patent

UNITED STATES PATENTS

| | | |
|---|---|---|
| 1,077,399 | Droitcour | Nov. 4, 1913 |
| 1,377,136 | Lawrence et al. | May 3, 1921 |
| 3,066,812 | Stadelman | Dec. 4, 1962 |